United States Patent [19]

Baermann

[11] 4,122,922
[45] Oct. 31, 1978

[54] INFINITELY VARIABLE WEAR-FREE EDDY CURRENT AND/OR HYSTERESIS BRAKE, PREFERABLY FOR TRACK-BOUND VEHICLES

[76] Inventor: Max Baermann, Bensberg-Wulfshof, Postach 26, 5060 Bergisch Gladbach 1, Fed. Rep. of Germany

[21] Appl. No.: 825,298

[22] Filed: Aug. 17, 1977

[51] Int. Cl.² .............................................. B60L 7/28
[52] U.S. Cl. .................................. 188/267; 188/165; 192/84 PM; 335/288; 335/306
[58] Field of Search .................... 188/267, 164, 165; 335/288, 295, 306; 104/148 MS; 148/31.57; 192/84 PM

[56] References Cited

U.S. PATENT DOCUMENTS

| | | | |
|---|---|---|---|
| 2,243,616 | 5/1941 | Bing et al. | 335/295 |
| 2,287,286 | 6/1942 | Bing et al. | 335/288 |
| 2,404,710 | 7/1946 | Hitchcock | 335/295 |
| 2,622,707 | 12/1952 | Faus | 188/267 |
| 3,591,428 | 7/1971 | Buschow et al. | 148/31.57 |

FOREIGN PATENT DOCUMENTS

| | | | |
|---|---|---|---|
| 483,018 | 7/1953 | Italy | 188/165 |
| 721,748 | 1/1955 | United Kingdom | 188/165 |

Primary Examiner—George E. A. Halvosa
Attorney, Agent, or Firm—Meyer, Tilberry & Body

[57] ABSTRACT

An eddy current or hysteresis brake, preferably for track bound vehicles which is infinitely variable and wear-free. A cylindrical rotatable permanent magnet magnetized on its diameter is arranged between a pair of pole pieces in combination with the plurality of stationary magnets, each arranged to magnetize the pole pieces with opposite magnetic polarity. By rotating the cylindrical magnet, the magnetic field at the ends of the pole pieces can be varied from a maximum to zero. The generated flux is projected into the track. Braking occurs by induced eddy currents.

14 Claims, 5 Drawing Figures

INFINITELY VARIABLE WEAR-FREE EDDY CURRENT AND/OR HYSTERESIS BRAKE, PREFERABLY FOR TRACK-BOUND VEHICLES

This invention relates to an infinitely variable wear-free eddy current and/or hysteresis brake, preferably for track bound vehicles, which is composed of one or a plurality of similar elements fastened adjacent to each other in the direction of motion.

An adjustable hysteresis brake which has already become known is provided with two ring magnets which are magnetized in the same direction and are turnable towards each other in order to completely cancel out the magnetic field used for braking or to provide a field of maximum value. With such a magnet arrangement only low braking forces can be achieved. Therefore these known hysteresis brakes have so far been used for reels in order to maintain a thread tension during reeling off that is as constant as possible.

To create a wear-free eddy current or hysteresis brake for vehicles it is necessary to have available in the air gap a high density of the magnetic lines of flux e.g. about 10,000–14,000 G in order to produce the highest possible braking force. For the generation of such high air gap inductions it has been difficult with known adjustable eddy current brakes to accommodate the required quantity of permanent magnet material in the small space available and with the lowest leakage possible. For this reason the known permanent magnetic eddy current brakes have relatively large dimensions. For the accommodation of e.g. a track brake between the running wheels of a bogie only a limited space is available. Moreover, the magnet material used in the permanent magnetic eddy current brakes of prior art is utilized badly due to the great leakage. The foregoing reasons have been essentially decisive for not introducing e.g. permanent magnetic track brakes into practice. Therefore electro-magnetically energized eddy current brakes and hysteresis brakes are used although these brakes have the disadvantage to be dependent on a separate current supply, e.g. from a battery or a generator provided.

A further disadvantage of the electromagnetic wear-free brakes is that if the source of current is interrupted, the brakes will fail. Apart from this dangerous moment in operation it has to be considered that the total electric energy for the production of the magnetic field is completely converted into heat so that already after a short time of braking the energizing coils are heated to very high temperatures. Therefore most of the electro-magnetically energized brakes generally provide a full braking effect for only relatively short periods of time.

To overcome the above-referred problems and others, it is the object of this invention to provide an infinitely variable wear-free permanent magnetic eddy current and/or hysteresis brake, preferably for track bound vehicles, which has low leakage losses.

In accordance with the invention there is provided one or a plurality of similar elements fastened adjacent to each other in the direction of motion, the total permanent magnet volume of each of said elements being composed of turnable and stationary permanent magnets, with the turnable permanent magnet being cylindrical and magnetized in the direction of its diameter, the cylindrical axis of said turnable permanent magnet being perpendicular to the surface to be braked, said stationary permanent magnets being square-shaped in cross section and elongated and arranged such that their greatest length is also perpendicular to the surface to be braked, each of said elements being provided with pole pieces made from soft iron which on their opposite inner surfaces are provided with segment-shaped recesses into which said turnable permanent magnet cylinder projects, said stationary permanent magnets being positioned with one pole at said pole pieces and with the other pole facing lateral flux return plates so that in the switched on position, the same poles of said stationary permanent magnets and said turnable permanent magnet cylinder are adjacent to the one same pole piece.

Due to the invention it is possible to accommodate the magnet material needed for the generation of a high air gap induction of e.g. about 12,000 G within a very small space. The stationary permanent magnets and the turnable permanent magnet cylinder which are both adjacent to the pole pieces of each element, serve to increase the density of the magnetic lines of flux in the pole pieces and are also part of the magnetic adjusting circuit. Due to the arrangement according to the invention the permanent magnet material accommodated in each element is utilized optimally. The poles of same polarity of the stationary permanent magnets and the poles of same polarity of the turnable permanent magnet cylinder are each adjacent to the same pole piece so that all magnetic lines of flux are collected by the pole pieces and directed to the working air gap. By means of the additional permanent magnets arranged between the pole pieces, the leakage occuring is minimized.

Contrary to the known eddy current brakes, where for the purpose of switching off, the total magnet volume accommodated must be displaced relative to the pole pieces, it is only necessary with the device according to this invention to move about half of the permanent magnet material provided relative to the pole pieces in order to adjust the braking torque. Thus switching on and off is achieved by relatively low forces.

It has been found that the highest braking force can be achieved with a length $l$ of each element of 70 mm ± 20 mm and an air gap between the pole face of the brake and the tread of about 7 mm. A considerable increase of this length reduces the number of alternating poles and consequently the braking force is reduced, too. If this length is decreased, the leakage occurring will increase so that a low braking force results as well.

By means of a suitable dimensioning of the magnetic circuit of each element, i.e. both of the stationary and the turnable permanent magnets, the magnetic field serving for braking can be reduced completely or, corresponding to the addition of both fields, it can be made to reach a maximum. To achieve a complete reduction when the movable magnet is turned, the total volume of the turnable permanent magnet cylinder of each element is up to 10% larger than the total volume of the stationary magnets, provided that for both magnets the same magnet material has been used. If a permanent magnet material of higher quality is used for the turnable permanent magnet cylinder, the volume can be correspondingly smaller than that of the stationary permanent magnets.

It is also possible that only part of the turnable permanent magnets, particularly the part arranged adjacent to the surface to be braked, is made from a permanent magnet material that is of higher quality than the material used for the remaining part of the turnable and stationary permanent magnets.

To achieve a particularly high air gap induction with the smallest magnet volume possible, a magnet material is preferably used for the turnable and stationary permanent magnets which is made from an alloy of rare earth materials with cobalt, as e.g. cobalt-samarium. This alloy has been known for about 10 years. As the permanent magnets made from rare earths are relatively brittle and tend to crack easily, the disc-shaped permanent magnets are arranged in layers one upon the other to form a cylinder. Between the layers of permanent magnets thin non-magnetic foils are arranged, which are e.g. made from non-magnetic steel as V2a-steel (registered trademark) and have a thickness of less than 0.3 mm. The disc-shaped permanent magnets which are assembled in this way to form a cylinder and are magnetized in the direction of their diameter, are arranged in a tube of non-magnetic material. In the same manner the stationary magnets may also be arranged in layers with non-magnetic foils being provided between the individual layers of permanent magnets.

To increase the reliability in operation of the brake, in particular this means to avoid the freezing of condensates which may occur between the stationary and turnable parts and to prevent any damages of the magnets caused by vibrations and shocks due to the rough nature of most rails for trains, a damping fluid, preferably silicone oil, is provided in the spaces between the stationary and turnable permanent magnets.

The principal object of the invention is the provision of a new and improved eddy current or hysteresis brake, preferably for track bound vehicles, which is infinitely variable, wear-free and easily and readily adjusted with a minimum of external force.

Another object of the invention is the provision of a new and improved track brake of the type described which provides a maximum braking effort for a given physical size brake.

Another object of the invention is the provision of a new and improved eddy current or hysteresis track brake wherein a cylindrical rotatable permanent magnet is arranged between a pair of pole pieces and magnetized on its diameter, and a plurality of stationary permanent magnets are provided polarized so as to magnetize the pole pieces with the opposite magnetic polarity, the cylindrical magnet being rotatable so as to change the flux at the ends of the pole pieces from a maximum to a minimum.

Another object of this invention is to provide an infinitely variable wear-free permanent magnetic eddy current and/or hysteresis brake which is easy to operate.

Still another object of this invention is to provide an infinitely variable wear-free permanent magnetic eddy current and/or hysteresis brake wherein a large volume of permanent magnet material can be accommodated in a design having relatively small dimensions and an optimal succession of alternating poles so that the necessary air gap induction for the production of sufficiently high braking forces is maintained.

The aforementioned objects and advantages will become apparent from the following description used to illustrate a preferred embodiment of the invention when read in connection with the accompanying drawings in which.

Figure 1:
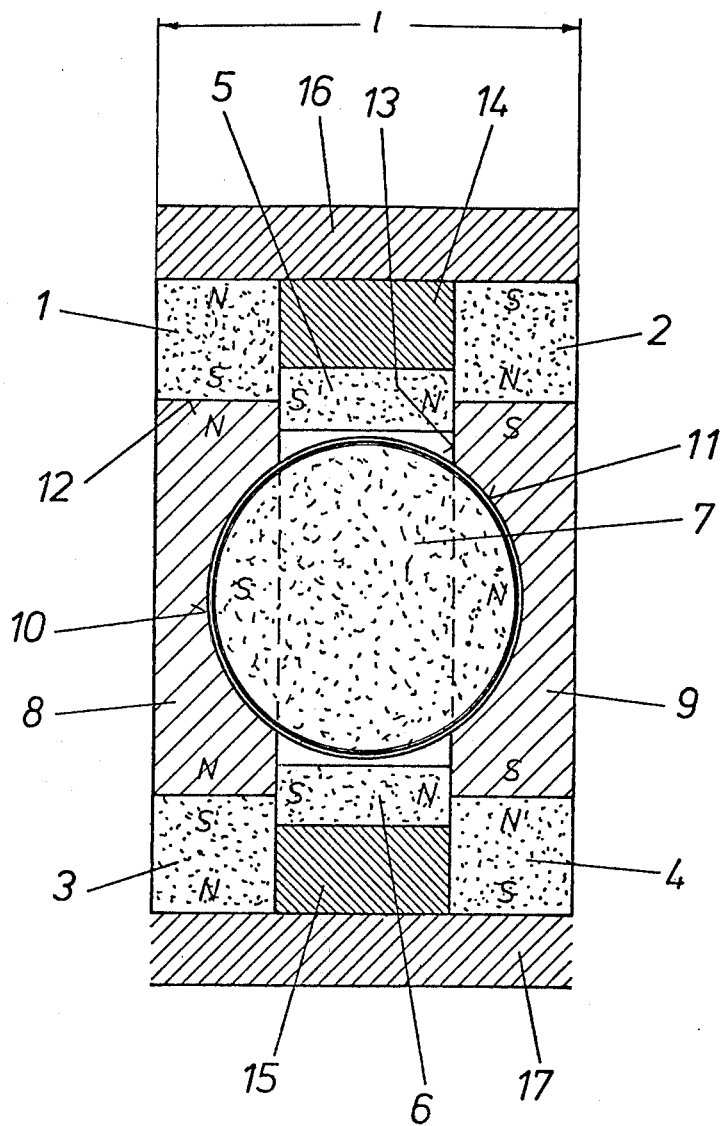
FIG. 1 is a horizontal section of a braking element of the brake along the line I—I of FIG. 3.
Figure 3:
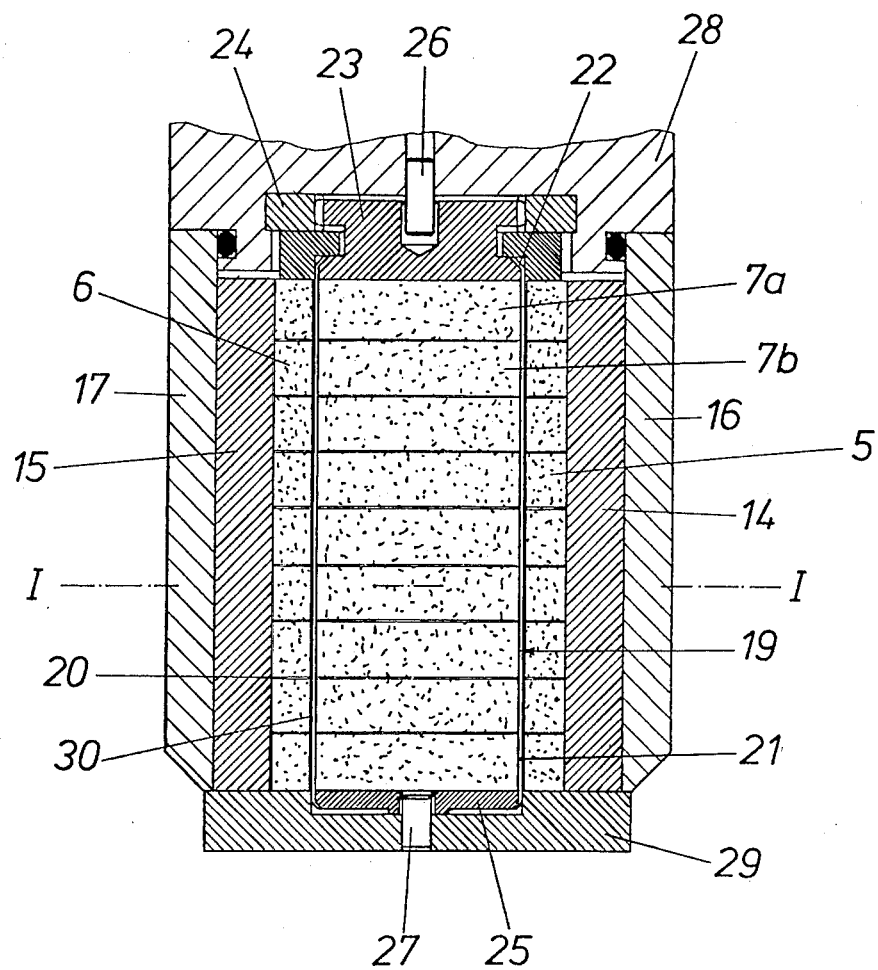
FIG. 3 is an enlarged vertical sectional view along the line II—II of FIG. 2.

According to FIG. 1 an element of the brake is composed of six stationary permanent magnets 1-6 and a turnable permanent magnet 7 which is cylindrical as can be seen from FIG. 3. Furthermore, two pole pieces 8,9 are provided (one half of each pole piece is illustrated) which have arcuate-shaped recesses 10, 11 on their opposite inner surfaces. The cylindrical turnable permanent magnet 7 projects into these recesses so as to have a minimum air gap therebetween. One magnetized pole of the stationary permanent magnets 1,2,3,4 is adjacent to small lateral faces 12 of the pole pieces 8,9 whereas the respective counterpole is adjacent to a pair of outside flux return plates and screen members, respectively 16,17 which confine the brake. With part of their poles the stationary permanent magnets 5 and 6 are contiguous to opposite inner faces 13 of the pole pieces 8,9 with the same polarity as the adjacent stationary magnets 1,2,3,4. Non-magnetic intermediate pieces 14,15 which are preferably made from aluminum, are provided between the stationary permanent magnets 1,2,3,4 and between magnets 5,6 and the outside flux return plate and screen member, respectively, 16,17. As can be seen from the polarities marked with the letters N and S, poles of same polarity of both the stationary permanent magnets and the turnable permanent magnet cylinder are adjacent to the pole pieces 8 and 9, respectively so that the pole piece 8 forms a north pole and the pole piece 9 a south pole. In this condition, the element is switched on. In this position of switching, all magnetic lines of flux emanating from the poles are collected and, within the pole pieces, directed to the working air gap 18. The stationary permanent magnets 5,6 are provided for the purpose of minimizing the leakage between the pole pieces 8,9 of opposite polarity.

Operation of the brake will be described subsequently.

Figure 2:
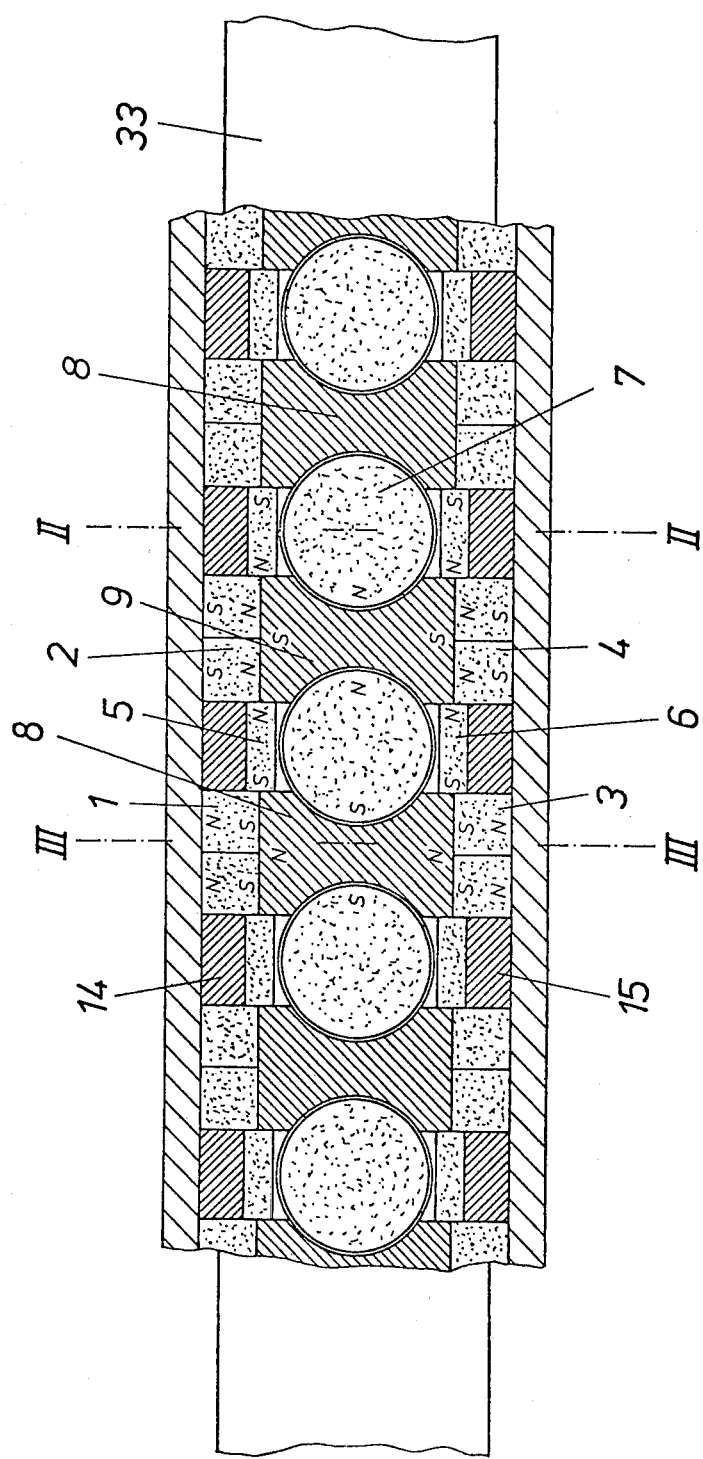
FIG. 2 is a horizontal section, partly broken away, through the brake, showing that several elements are arranged adjacent to each other in the direction of motion or the rail, respectively.

FIG. 2 clearly shows the complete arrangement of the brake that is composed of a plurality of elements according to FIG. 1, which are provided in longitudinal direction to the direction of motion or the rail, respectively.

The vertical section of FIG. 3 along the line II—II of FIG. 1 shows the assembly of the turnable permanent magnet 7 that consists of individual permanent magnet discs 7a,7b etc. which are arranged in layers one upon the other and form a cylinder 19. To avoid the formation of cracks, thin non-magnetic foils 20 having a thickness of about 0.2 mm are arranged between the individual permanent magnets. These foils are made from non-magnetic steel such as e.g. V2a-steel (registered trademark).

This arrangement will be particularly suitable if the permanent magnets are made from rare earth alloys which are relatively brittle and tend to crack and break under the influence of shocks.

For providing a better stability and avoiding cracks, the breaking out of edges and the like, the permanent magnet discs 7a of the cylinder 19 which are arranged in layers one upon the other, including the intermediate non-magnetic foils, are arranged in a tube 21 of non-magnetic material. The upper front face 22 of the tube is provided with a toothed wheel or gear 23 in which opposite toothed racks 24 engage for the purpose of turning the magnet cylinder 7. The bottom side of the magnet cylinder 7 is pivoted by means of shafts 26,27. These shafts are fastened to a cover plate 28 and a non-magnetic base plate 29.

FIG. 3 further shows the stationary magnets 5,6, the non-magnetic intermediate pieces 14, 15 and the flux return plates and screen members, respectively, 16, 17 which confine the longitudinal sides of the brake. For increasing the reliability in operation, particularly at low temperatures and under the influence of shocks, a damping fluid, e.g. silicone oil, is provided in the air gap 30 between the turnable magnet cylinder 19 and the stationary permanent magnets.

Figure 4:
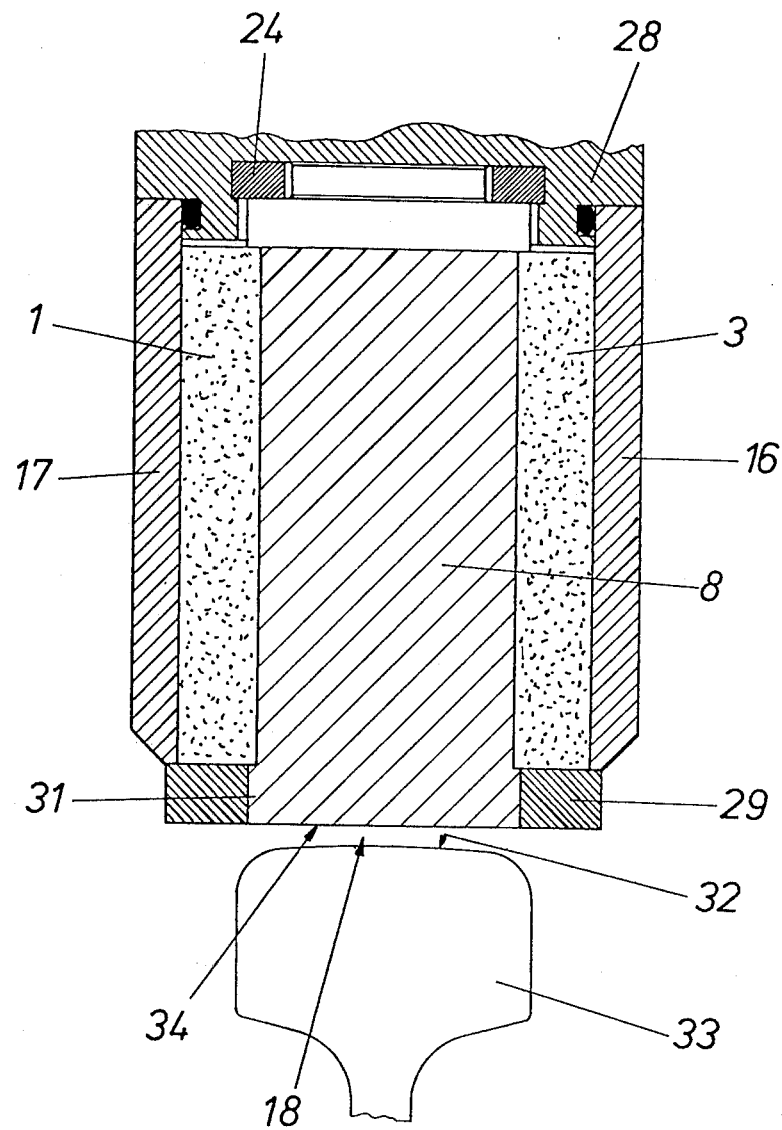
FIG. 4 is an enlarged vertical sectional view of the brake along the line III—III of FIG. 2.

As may be seen in FIG. 4, showing the vertical section along the line III—III of FIG. 2, the stationary magnets 1,3 are adjacent to the pole piece 8. At its lower part this pole piece is broadened towards the pole head 31. The working air gap 18 of about 7 mm is provided between the pole face 34 of the pole head 31 and the tread 32 of the rail (shown partly broken away). The pole head projects into the non-magnetic base plate 29 and is flush with the bottom side of this plate.

Figure 5:
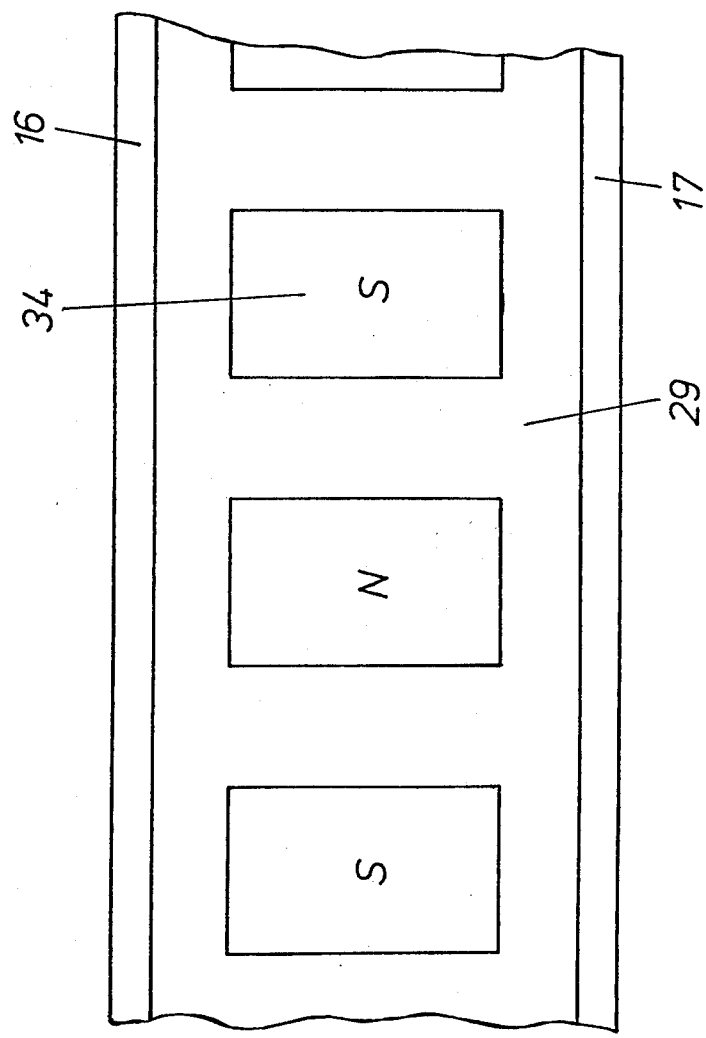
FIG. 5 is a bottom plan view of the brake.

The bottom plan view of the brake according to FIG. 5 shows the pole faces 34 of the pole heads which are arranged in corresponding recesses of the non-magnetic base plate 29.

In FIG. 2 the brake is shown in switched-on position. The poles of both the stationary and the turnable permanent magnets are marked with the letters N and S. As may be seen in the drawing, the south poles of both the stationary and the turnable permanent magnets are adjacent to the pole piece 8, whereas the north poles of the stationary and turnable permanent magnets are contiguous to the pole piece 9. In this matter a north pole results in the pole piece 8 and a south pole in the pole piece 9. Thus two magnetic circuits are formed, both contributing to the excitation of the pole pieces and the adjustment of the braking torque. In this position of switching the lines of magnetic flux of the magnetic circuit emanate from the pole piece 8, cross the air gap 18, pass through the rail 33 and enter into the pole piece 9 of opposite polarity. If for the purpose of switching off the permanent magnets 7 are turned by 180° by opposite displacement of the racks 24, poles of alternate polarity are adjacent to the pole pieces so that the lines of magnetic flux short-curcuit within the magnet arrangement of each element and the resulting magnetic field in the air gap is cancelled out.

Depending on the desired value, the braking torque can be infinitely varied by turning the turnable permanent magnets by more or less degrees.

In order to switch off the brake completely, the magnet volume of the turnable permanent magnets must be about 10% larger than the total volume of the stationary permanent magnets, provided that the same magnet material is used for both the turnable and the stationary permanent magnets.

In order to obtain the highest possible air gap induction and consequently particularly effective braking forces, the permanent magnet material preferably used for the stationary and turnable magnets may be an alloy of rare earths with cobalt. Of course, the invention is not limited to this magnet material. Any other magnet material having the highest possible (BH) max-value may be used as well.

The invention is not restricted to the aforedescribed embodiment. Instead of a plurality of stationary permanent magnets it is also possible to provide only one stationary permanent magnet adjacent to the turnable permanent magnet.

It is further possible to form the pole pieces, which are provided with segment-shaped recesses, as a whole body or subdivide them centrally.

Often it is desired that the brake acts on ring- or disc-shaped surfaces. In this case, the brake is formed as a ring-segment-shaped body.

For braking a track-bound vehicle the ring-segment-shaped brake may be arranged on one or both sides of the running wheels or on one or both sides of a brake disc arranged on the wheel axle such that the pole faces of the brake are opposite to the front faces of the wheel rim or brake disc.

Having thus described my invention, I claim:

1. An infinitely variable wear-free permanent magnetic eddy current and/or hysteresis brake, preferably for track-bound vehicles, comprising: one or a plurality of similar elements fastened adjacent to each other in the direction of motion, the total permanent magnet volume of each of said elements being composed of turnable and stationary permanent magnets, with the turnable permanent magnet being cylindrical and magnetized in the direction of its diameter, the cylinder axis of said turnable permanent magnet being arranged in perpendicular direction to the surface to be braked, said stationary permanent magnets being elongated and square-shaped in cross section with their greatest length also extending in perpendicular direction to the surface to be braked, each of said elements being provided with pole pieces made from soft iron which on their opposite inner surfaces are provided with arcuate-shaped recesses into which said turnable permanent magnet cylinder projects, said stationary permanent magnets being positioned with one pole facing said pole pieces and with the other pole facing lateral flux return plates so that in switched on position the same poles of said stationary permanent magnets and said turnable permanent magnet cylinder are each adjacent the same pole piece.

2. The device according to claim 1, wherein the length of each of said elements is 70 mm ± 20 mm.

3. The device according to claim 1 wherein said permanent magnetic cylinder is composed of disc-shaped permanent magnets which, in the direction of the cylinder axis, are arranged in layers one upon the other.

4. The device of claim 3 wherein said disc-shaped magnets are in a non-magnetic tube.

5. The device according to claim 3 wherein part of said permanent magnets arranged in layers one upon the other, particularly the part adjacent to said surface to be braked, is composed of a permanent magnet material that is of higher quality than the material used for the remaining part of said turnable and stationary permanent magnets.

6. The device according to claim 1 wherein one end of said permanent magnetic cylinder is provided with a toothed wheel which two opposite racks engage for the purpose of turning the toothed wheel.

7. The device according to claim 1 wherein said stationary magnets are cubes arranged one upon the other in vertical direction to said surface to be braked and are magnetized such that poles of same polarity are always adjacent to said pole pieces.

8. The device according to claim 7 wherein the permanent magnet material of said turnable and stationary permanent magnets consists of an alloy of rare earth with cobalt, as e.g. cobalt-samarium.

9. The device according to claim 1 wherein said turnable permanent magnet is in the form of discs arranged in layers one upon the other and said stationary permanent magnets are in the form of blocks also arranged in layers one upon the other and thin non-magnetic foils, e.g. non-magnetic steel, having a thickness of about 0.3 mm are provided between said discs and blocks.

10. The device according to claim 1 including a non-magnetic base plate, the end of said turnable magnet projecting into a recess provided in said base plate.

11. The device according to claim 1 wherein the total volume of said turnable cylindrical permanent magnet of each of said elements is up to 10% larger than the total volume of said stationary permanent magnets and the same magnet material is used for both.

12. The device according to claim 1 wherein said turnable permanent magnet of each of said elements has a correspondingly smaller magnet volume than that of said stationary permanent magnets and a magnet material of higher quality is used for said turnable permanent magnet.

13. The device according to claim 1 wherein a damping fluid, preferably silicone oil, is provided in the spaces between said stationary and said turnable permanent magnets.

14. The device according to claim 1 wherein said pole pieces have different polarity with additional permanent magnets provided therebetween which are magnetized in the direction of motion in order to keep the leakage as low as possible.

* * * * *